United States Patent [19]
Kaminski et al.

[11] Patent Number: 5,889,080
[45] Date of Patent: Mar. 30, 1999

[54] FRICTION MATERIALS CONTAINING BLENDS OF ORGANIC FIBROUS AND PARTICULATE COMPONENTS

[75] Inventors: Stanley Sigmund Kaminski, Stamford; Robert Ellsworth Evans, Huntington, both of Conn.

[73] Assignee: Sterling Chemicals International, Inc., Houston, Tex.

[21] Appl. No.: 874,597

[22] Filed: Jun. 13, 1997

Related U.S. Application Data

[63] Continuation of Ser. No. 380,266, Jan. 30, 1995, abandoned, which is a continuation-in-part of Ser. No. 287,736, Aug. 9, 1994.

[51] Int. Cl.[6] .................................................. C08J 5/14
[52] U.S. Cl. ........................ 523/156; 523/149; 523/152; 523/153; 523/155; 523/157; 523/158; 525/142; 525/180; 525/238
[58] Field of Search ..................................... 523/149, 152, 523/153, 154, 155, 156, 157, 158, 222; 525/238, 180, 142

[56] References Cited

U.S. PATENT DOCUMENTS

| | | | |
|---|---|---|---|
| 2,691,645 | 2/1954 | Haw | 260/79.5 |
| 4,137,214 | 1/1979 | Sochalski | 260/38 |
| 4,324,706 | 4/1982 | Tabe et al. | 523/149 |
| 5,004,497 | 4/1991 | Shibata et al. | 75/229 |
| 5,106,887 | 4/1992 | Horignchi | 523/155 |
| 5,362,562 | 11/1994 | Evans et al. | 428/369 |

FOREIGN PATENT DOCUMENTS

| | | |
|---|---|---|
| A-264 096 | 4/1988 | European Pat. Off. . |
| A-352 363 | 1/1990 | European Pat. Off. . |
| A-444 473 | 9/1991 | European Pat. Off. . |
| A-510 257 | 10/1992 | European Pat. Off. . |
| A-511838 | 11/1992 | European Pat. Off. . |
| A-557 905 | 9/1993 | European Pat. Off. . |
| A-616003 | 9/1994 | European Pat. Off. . |
| A-647 793 | 4/1995 | European Pat. Off. . |
| A-2 507 123 | 12/1982 | France . |
| A-37 35 634 | 5/1989 | Germany . |
| A-224 285 | 5/1990 | United Kingdom . |
| WO-A-9218578 | 10/1992 | WIPO . |

*Primary Examiner*—James J. Seidleck
*Assistant Examiner*—U. K. Rajguru
*Attorney, Agent, or Firm*—Tobor & Goldstein, L.L.P.

[57] ABSTRACT

A method for making a dry blend for use in the preparation of a friction material, a dry blend per se and dry friction materials is disclosed wherein the components thereof include a) fibrillated, organic, synthetic polymer, b) organic, synthetic polymer staple and c) organic, synthetic soluble polymer particles.

19 Claims, No Drawings

FRICTION MATERIALS CONTAINING BLENDS OF ORGANIC FIBROUS AND PARTICULATE COMPONENTS

CROSS-REFERENCE TO RELATED APPLICATIONS

This application is a continuation of application Ser. No. 08/380,266, filed Jan. 30, 1995, now abandoned, which is a continuation-in-part of our copending U.S. application, Ser. No. 08/287,736, filed Aug. 9, 1994.

BACKGROUND OF THE INVENTION

This invention relates to a method of making a dry blend of a) fibrillated, organic, synthetic polymer, b) synthetic, organic polymer fiber staple and c) synthetic, organic, soluble polymer particles, non-asbestos type friction materials produced from the resultant blends for the purpose of improving their preformability and in many cases, improving the physical properties of the resultant cured friction material and various dry blends per se. Preforms are compressed components of a friction material. The preforms, in the general shape of the resultant cured friction material, are formed under pressure at ambient temperature and subsequently transferred into a hot mold for final cure under heat and pressure. Many friction formulations require the use of a preforming aid to enable the preforms to achieve sufficient integrity to allow the transfer of the preform to the hot mold. The preforms serve as intermediate products in the manufacture of friction elements such as brake linings, disk pads, truck blocks, off highway brakes, clutch facings and the like.

As is well recognized, it has become incumbent upon the industry to find a cost-effective replacement for asbestos in friction materials because of the health, environmental and safety hazards attributed to asbestos. Numerous approaches to the replacement of asbestos have led to a substantial body of technology and prior art that has resulted in at least two major categories of non-asbestos formulations. They are: 1) semi-metallic materials, and 2) organic non-asbestos materials. These materials are more fully discussed in U.S. Pat. No. 4,866,107, hereby incorporated herein by reference.

The elimination of asbestos from friction material formulations, although relatively successful, has caused, however, various other problems not the least of which is difficulty in preforming and processing blends of ingredients for the manufacture of preforms, the reduced strength and toughness of preforms produced from other ingredients, the increased cost of said ingredients vis-a-vis asbestos and the physical and frictional performance of said finished products compared to asbestos-containing materials. Additionally, many of the asbestos replacement type formulations for friction materials have failed to achieve success due to reduced frictional/thermal stability properties of the molded friction material which render them less competitive.

Most attempts to eliminate asbestos fibers from friction material formulations have centered around the use of other organic and inorganic fibrous materials, alone or in conjunction with a myriad of different components.

For example, U.S. Pat. No. 4,145,223 incorporates glass fibers and ceramic fibers whereas U.K. Published Application No. 2027724A employs preoxidized acrylic fibers. Similarly, U.S. Pat. No. 4,197,223 and U.K. Patent No. 1604827 teach mixtures of inorganic and organic fibers such as glass fibers, mineral wools, alumino-silicate fibers, wood pulp, jute, sisal and cotton linters. Aramid fibers are taught in U.S. Pat. Nos. 4,374,211 and 4,384,640 and acrylic fibers are shown in U.S. Pat. Nos. 4,418,115; 4,508,855; 4,539,240 and 4,656,203; G.B. Published Application No. 2,129,006A and Japanese Published Application Nos. 87/106,133; 87/89, 784 and 87/149,908.

Additionally, in U.S. Pat. No. 4,324,706 there is disclosed the combination of pulp-like particles of heat-resistant aromatic polymeric materials, inorganic or organic fibrous materials, friction-regulating agents and thermosetting polymer binders.

U.S. Pat. No. 4,866,107 claims a composition of a thermosetting binder resin, a fibrous reinforcing material and a fibrillated acrylonitrile polymer-based fiber of an Efficiency Index from about 0.8 to about 2.0.

European Published Patent Application No. 0,282,004 discloses a reinforcing mixture for friction products employing a polyacrylonitrile wet gel containing an additive comprising polyethylene glycol esters of pelargonic acid, enanthic acid, caprylic acid, capric acid and blends thereof etc.

Recently issued U.S. Pat. No. 5,106,887 teaches the formation of non-asbestos friction materials comprising fibrillated acrylic fibers admixed with glass fibers, heat resistant organic fibers, inorganic fibers or metallic fibers wherein the fibrillated acrylic fibers have a CANADIAN STANDARD FREENESS (CSF) of at least 450 ml whereas U.S. Pat. No. 5,004,497 claims a friction material comprising 0.85–30%, by weight, of carbon fibers and 2–20%, by weight, of aramid fibrillated and chopped fibers. The material may contain 3–20%, by weight, of polyimide dust, melamine dust, cashew dust or phenol dust. These dusts are cured thermosetting resins, and as such, are not soluble and therefore do not fall within the scope of the present invention. The '887 patent does not mention the inclusion of organic, synthetic polymer particles and, in fact, specifically discloses that the organic fibers are aramid pulp, a fibrillated fiber.

Moreover, PCT Published Application No. WO93/04300 teaches the production of a composite friction material comprising a matrix resin, a fiber reinforcing material and aramid particles. The fibrous reinforcing material may be pulp or floc, but not both.

All of the above cited references fail to recognize the unique cooperative effect which is achieved by employing the unique dry blend prepared by the process of the present invention. The references either fail to teach the use of particles of synthetic, soluble organic polymer or, if such particles are suggested, fail to include one or both of the other critical components of the present invention. More specifically, U.S. Pat. No. 4,324,706 teaches pulp-like particles such as fibers, films, flakes or ribbons each provided with a plurality of tentacle-like projections in combination with staple fibers. No polymer particles having diameters of less than 60 microns are disclosed in the '706 patent, the particles of this reference being more akin to fibrillated fiber component a) hereof than the particles c).

U.S. Pat. No. 4,866,107 teaches a blend of a fibrillated fiber and other organic, synthetic polymer fibers but does not mention that said other fibers are staple or that particles of organic, synthetic polymer must be employed therewith.

The WO93/04300 published application is probably the closest prior art as relates to the instant invention. The '300 application utilizes aramid particles as wear additives in the formation of friction materials in conjunction with fibers in the form of floc or pulp. The floc is described as fibers cut to lengths of 1–10 mm whereas the pulp is described as fibrillated fibers. Both the pulp or floc are preferably composed of aramid-type polymers. The aramid particles range from 10–250 microns in size, the smallest being described as providing processing assistance by aiding the opening of the fibrillated fiber during mixing but the application does not discuss preforming benefits. The friction materials produced by the process of this invention differ from those taught by the '300 application in that herein there is employed both a fibrillated fiber and a fiber staple in conjunction with the soluble, organic, synthetic polymer particles. This combination of ingredients has been found to provide unexpectedly superior results with respect to performance and in many cases, superior physical, frictional/thermal properties as shown below.

Related patents which show blends of fibrous materials and polymer particles include U.S. Pat. No. 3,325,345 which is limited to fibrillated cellulosic fibers; U.S. Pat. No. 4,387,178 which requires the presence of a polyacrylic latex; U.S. Pat. No. 4,485,138 which requires the presence of rubber to prepare a vulcanized blend of fibers; U.S. Pat. No. 4,495,030 which includes submicron size glass fiber in a toxic vapor absorptive filter material; U.S. Pat. No. 4,748,075 which teaches a soft gasketing material composed of at least three (3) different fibers, natural fibers, synthetic organic fibers and mineral or metal fibers. No organic, synthetic, soluble polymer particles are added thereto.

U.S. Pat. No. 4,769,274 teaches the production of inexpensive mats using a coarse, cellulosic fiber, thermoplastic synthetic polymer fibrils and non-fibrous, thermoplastic, synthetic polymer particles. The products are used as door panels, interior/exterior partitions, molded doors, etc., when laminated with other disclosed ingredients. No disclosure of friction materials is made.

U.S. Pat. No. 5,190,657 is related to blood filters comprised of specific denier interlocked, textile fibers and certain fibrillated particles of polymeric material as taught in U.S. Pat. No. 4,274,914. The particles are described as not being fibers.

U.S. Pat. No. 5,272,198, by the present inventors, relates to a reinforced material comprised of an elastomeric matrix and a small denier acrylic fiber which may be used in conjunction with other fibers such as glass fibers, polyolefin fibers, polyamide fibers, polyester fibers, polyimide fibers etc. No particles of synthetic, soluble, organic polymer are added.

SUMMARY OF THE INVENTION

The present invention relates to a dry processed friction material comprising from about 1 to about 30 weight percent of a dry blend comprising:
  a) from about 25 to about 90 weight percent of a fibrillated, synthetic, organic polymer fiber;
  b) from above about 20 to about 60 weight percent of a synthetic, organic polymer staple fiber, and
  c) from about 5 to about 70 weight percent of synthetic, soluble organic polymer particles.

More particularly, the present invention relates to a friction material comprising from about 1 to about 30 weight percent of a dry blend comprising:
  a) from about 25 to about 90 weight percent of a fibrillated, synthetic, organic polymer fiber;
  b) from above about 20 to about 60 weight percent of a synthetic, organic polymer staple fiber and
  c) from about 5 to about 70 weight percent of synthetic, soluble, organic polymer particles,
wherein at least one of a), b) and c) is an acrylic polymer.

When at least one of a), b), and c) is a high molecular weight acrylic or a preoxidized polymer acrylic there is provided improved physical/thermal properties in the finished friction mix.

A method for the production of a dry blend useful in the production of this invention wherein the fibrillated synthetic organic polymer fiber and the synthetic, organic polymer staple are blended in water, alone or in combination with the synthetic, soluble, organic polymer particles and dried, whereby increased amounts of staple are capable of being incorporated into the resultant dry blend, which also forms part of this invention.

DESCRIPTION OF THE INVENTION INCLUDING PREFERRED EMBODIMENTS

It has been found, as taught in Applicants' abovementioned copending application, that the production of non-asbestos type friction material preforms can be materially enhanced by use of dry fiber/particle blends. Particularly, the staple fibers and particles, which when used individually are generally not preform and processing aids, significantly contribute to the preformability of dry non-asbestos friction mixes when used together in combination with a fibrillated fiber or fibers. The performance of these synergistic blends as preforming aids was found to be unexpectedly superior to fibrillated fiber alone, on an equal pulp content basis, and in many instances, the dry blends were shown to be more effective preform aids than fibrillated fiber alone on an equal weight basis.

Furthermore, the dry fibrillated fiber/staple fiber/particle blends were disclosed as being capable of being tailored to exact performance requirements especially at lower production cost. The blends impart strength and stiffness to the preforms produced therefrom enabling preform transfer to hot molds without deleteriously damaging them for curing into brake shoes, pads etc. as well as providing improved physical properties and friction/thermal stability as compared to like amounts of the fibrillated fiber alone.

The dry blends of Applicants' copending application are disclosed as containing from about 5 to about 20 weight percent of the synthetic, organic polymer staple fiber and the basic dry blending procedure taught therein clearly resulted in the formation of dry blends containing said concentration. However, it has now been found that greater quantities of the synthetic organic polymer staple fiber can be incorporated into dry blends and thereafter into dry friction materials of the fibrillated, synthetic organic polymer fiber and the synthetic, organic polymer staple fiber are blended in water at a solids content of no more than about 5%, by weight, together or in conjunction with the soluble, synthetic organic polymer particles and drying the resultant blend.

That is to say, any of the following sequences may be followed according to the process of the instant invention:
  Procedure 1) A slurry of the fibrillated, synthetic organic polymer fiber may be blended with dry synthetic, organic polymer staple to no more than 5% solids, by weight, the resultant two component slurry may be dried and the dry blend may be admixed with the soluble, synthetic organic polymer particles.
  Procedure 2) Procedure 1 may be followed with dry fibrillated fiber and a slurry of staple fiber.
  Procedure 3) Procedure 1 may be followed with slurries of both the fibrillated fiber and the staple fiber.
  Procedure 4) Procedure 1 may be followed except that dry fibrillated fiber and dry staple are, individually or together, added to water to form the slurry.
  Procedure 5) Procedures 1–4 may be followed by forming the 5% (or less) slurry in the presence of the soluble particles of synthetic organic polymer and drying the resultant three component slurry.

The slurry formed should contain no more than about 5% solids, by weight, based on the total weight of the slurry, preferably from about 0.5 to about 5%, more preferably from about 1.0 to about 3.5%, by weight, same basis.

The fibrillated fibers which form the first component of the dry blends formed by the process of the instant invention are well known to those skilled in the art and any fibrillated fiber known to be useful in friction materials is useful herein. Specifically, and most preferably, fibrillated acrylic polymer fibers may be employed. These fibrillated fibers preferably have a Canadian Standard Freeness (CSF) of below about 600 ml and have been preferably formed from a polymer whose melting point is above about 450° F. They should have a length ranging from about 2mm to about 10 mm and a diameter of from about 8 microns to about 50 microns.

Preferred fibers are fibers of polymers having an acrylonitrile content of at least 85% (based on weight of acrylonitrile monomer content to total monomer content of the pre-polymerization mixture). Particularly useful fibers are those of polymers having an acrylonitrile content in excess of about 89%. The preferred comonomers comprise methyl methacrylate or vinyl acetate which are preferably present at levels of approximately 8.5%, by weight, as discussed above.

An even more preferred fibrillated fiber is that produced from a random bicomponent fiber made from a 50/50 mixture of a 90/10 acrylonitrile/methyl methacrylate or vinyl acetate copolymer and a 93/7 acrylonitrile/methyl methacrylate or vinyl acetate copolymer. Other comonomers may be used without limitation provided that their inclusion does not materially detract from the ability of the fiber to be fibrillated nor with the properties of the fibrillated fiber produced. Compatibility of such other monomers can easily be determined by one skilled in the art by simple experimentation. Alternatively, the acrylic fiber can be homopolymer.

Canadian Standard Freeness is measured as is described in a test set forth in an article entitled "Freeness of Pulp"; Tentative Standard 1943; Official Standard 1946; Revised 1958 and Official Test method 1985; Prepared by The Technical Committee of the Tappi Association.

The fibrillated acrylonitrile fibers useful in the process of the instant invention can be made in any known manner such as by using a modified commercial blender. In general, modified Waring brand commercial blenders wherein the as-supplied blade has been modified to provide a break edge of about 0.25 mm on the working edge, may be used. In operation, a relatively dilute slurry of precursor fiber in water is generally introduced into the blender device which is then run for from at least about one-half hour to at least about one hour depending upon the molecular weight and diameter of the fiber being used. The fibrillated fibers are well known to those skilled in the art and can be prepared as is known to them such as described in the patents mentioned above, e.g. U.S. Pat. No. 4,866,107. Additionally, U.S. Pat. No. 4,811,908 teaches such a method, said patents hereby being incorporated herein by reference.

Fibrillated high modulus/high molecular weight acrylic fiber may also be used. By "high molecular weight" is meant a weight average molecular weight of at least about 150,000. The fibrillated fibers useful herein may also contain additives such as cyanoguanidine (DICY), metal salts, N-substituted malimides, etc. to enhance thermal stability.

The fibrillated fibers may also be formed from other polymers and still be useful in the process of the present invention. Thus, aliphatic polyamides, polyesters. polyvinyl alcohols, polyolefins, polyvinyl chlorides, polyvinylidene chlorides, polyurethanes, polyfluorocarbons, phenolics, polybenzimidazoles, polyphenylenetriazoles, polyphenylene sulfides, polyoxadiazoles, polyimides, aromatic polyamides etc. may be used. The aromatic polyamides (aramids) are the secondmost preferred after the acrylic polymers discussed above, followed by the cellulose acetates, polybenzoxadiazoles, polybenzimidazoles, etc. Aramid polymers such as poly (p-phenylene terphthalamide) and poly (m-phenylene isophthalamide) are exemplary.

Aramids, as used herein, are intended to include wholly aromatic polycarbonamide polymers and copolymers of recurring units of the formula

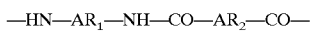

wherein $AR_1$ and $AR_2$, which may be the same or different, represent divalent aromatic groups. Para-aramids refer to para-oriented aromatic polycarbonamides of Formula I, above, wherein $AR_1$ and $AR_2$, which may be the same or different, represent divalent, para-oriented, aromatic groups. By "para-oriented" is meant that the chain extending bonds from aromatic groups are either coaxial or parallel and oppositely directed, for example, substituted or unsubstituted aromatic groups including 1,4-phenylene, 4,4'-biphenylene, 2,6-naphthalene, and 1,5-naphthalene. Substituents on the aromatic groups other than those which are part of the chain extending moieties should be nonreactive and must not adversely affect the characteristics of the polymer for use in the practice of this invention. Examples of suitable substituents are chloro, lower alkyl and methoxy groups. The term para-aramid also encompasses para-aramid copolymers of two or more para-oriented comonomers including minor amounts of comonomers where the acid and amine functions coexist on the same aromatic species, for example, copolymers produced from reactants such as 4-aminobenzoyl chloride hydrochloride, 6-amino-2-naphthoyl chloride hydrochloride, and the like. In addition, para-aramid encompasses copolymers containing minor amounts of comonomers containing aromatic groups which are not para-oriented, such as, for example, m-phenylene and 3,4'-biphenylene. Those taught in WO93/04300, incorporated herein by reference, are exemplary.

The fibrillated fiber components may be crimped or non-crimped.

Preferably the fibrillated acrylic fiber should have a BET surface area of over $5M^2/g$, a CSF from 50 to 600, a modulus of 2.75 GPa to 16.5 GPa, a number average molecular weight of 75,000 to 500,000 and a specific gravity of 1.1 to 1.2

The second critical component of the dry blends produced in accordance with the instant invention is a synthetic, organic polymer, staple fiber. Any of the polymers discussed above with respect to the fibrillated fiber component can be utilized to produce the polymer forming the staple fiber component. The preferred staple fiber is one made from an acrylic polymer i.e. acrylonitrile polymer, as discussed above. The staple fiber may also be crimped or non-crimped. It preferably has a length of from about 0.5mm to about 12mm, more preferably from about 1.5mm to about 7mm. It preferably has a diameter of from about 8 microns to about 50 microns, more preferably about 10 to about 25 microns, a modulus of 2.75 GPa to 85 GPa and a specific gravity of 0.90 to 2.00.

Preferably, the staple fiber is an acrylic staple with a minimum modulus of 2.75 GPa and a minimum weight average molecular weight of 75,000 and a specific gravity of 1.15 to 1.2. The acrylic staple fibers may be either prepared from copolymers or homopolymers as discussed above.

Preferably, the staple fiber for higher temperature and/or structural performance is an acrylic staple fiber having 1) additives to increase thermal stability or 2) high modulus/ high molecular weight with a minimum modulus of 5.5 GPa and a minimum weight average molecular weight of 150,000, or 3) been preoxidized to a greater than 30% reduction in its nitrile group content to result in a minimum modulus of 5.5 GPa because of thermal treatment or 4) any combination of 1)-3). These preferred acrylic staple fibers provide improved frictional/thermal stability and/or strength to the friction material produced therefrom.

The fiber staple may have a circular or non-circular cross-section, i.e. may be ribbon fiber, or may be dog bone shaped, S-shaped, C-shaped etc. The staple fiber may be milled, may be in the form of floc, may contain thermal stability enhancing additives, may be slightly to fully pre-oxidized, may be carbon fiber, or the like.

The third component of the dry blends resulting from the process of the present invention is a particulate, synthetic, soluble, organic polymer. The particulate component may also be produced from many of the above-discussed polymers from which the fibrillated fiber component is prepared as long as it is soluble. By the term "soluble", as used herein, is meant that the polymer from which the particles are made is soluble in some medium i.e. organic solvent, water, acid etc. and the particle maintains its physical identity after being cured into the ultimate friction device. The particulate may be formed by reaction or by grinding and/or pulverizing larger pieces of polymer.

Again, preferably, the particulate component is produced from an acrylic polymer. The particulate component may be solid or porous and may have an average diameter below about 60 microns. More preferably, the particulate is formed during the polymerization of acrylonitrile by a bulk, emulsion, aqueous-suspension or slurry process which causes a polymer particulate to be precipitated or suspended from drops of monomer or dissolved monomer as discussed in U.S. Pat. 2,983,718. German Patent 1,093,990, Brit. Patent 866,445, U.S. Pat. 2,691,645 and U.S. Pat. 2,963,457. The particulate components preferably have a BET surface area of at least about $1m^2/g$ and a specific gravity of from about 1.10 to about 1.20. For higher temperature stability, preferably the particulate acrylic component is preoxidized to a greater than 30% reduction in nitrile group content and to increase its specific gravity to about 1.25 to 1.38.

The friction material preform aid dry blend of the present invention comprises from about 25 to about 90 weight percent of the fibrillated fiber, preferably from about 35 to about 90 weight percent; from above about 20 to about 60 weight percent of the staple fiber, preferably from about 25 to about 50 weight percent and from about 5 to about 70 weight percent of the particulate soluble polymer, preferably from about 5 to about 60 weight percent, the total weight percent of all three components. of course, being 100%. Preferably at least one of the three components of the blend is an acrylic polymer. More preferably, two components are acrylic polymers and most preferably, every component is an acrylic polymer.

When at least either the staple fiber or the particulate component is an acrylic polymer, the particulate component can be carbonized, but it is preferred that the particulate polymer be non-carbonized.

Two general types of non-asbestos type friction materials compounded as mixes of dry ingredients have evolved in the art. They are semi-metallic materials and organic non-asbestos materials. Each type can be effectively modified with the blends discussed above in accordance with the present invention, as discussed above.

Semi-metallic systems typically include powdered phenolic resins; carbonaceous particles, such as graphite or carbon particles; non-asbestos fibers; inorganics such as magnesium oxide, zircon, mullite and alumina; metals, such as those of iron, copper, brass and stainless steel in the form of powders, shavings. fibers etc.; and other modifiers, such as elastomers and inorganic wear fillers.

Semi-metallic systems typically may contain the following amounts of the following constituents:

| Ingredient | Wt. % |
| --- | --- |
| Phenolic Resin | 4–13 |
| Graphite or Carbon Particles | 14–15 |
| Fibers[1] | 0–25 |
| Ceramic Powders[2] | 2–10 |
| Metal Powders[3] | 14–15 |
| Other Modifiers[4] | 0–20 |

[1]steel, ceramic or carbon fibers
[2]magnesium oxide, zircon, mullite, alumina
[3]iron, copper, brass, stainless steel
[4]elastomers, inorganic fibers In the manufacture of friction elements by the dry blending technique, the semi-metallic friction material constituents are mixed together to form a homogenous mixture. The mixture is then usually pressed into a preform. The preform is then transferred to a second press where pressure and heat are simultaneously applied, causing the resin to melt and flow throughout the piece forming a continuous matrix for holding the other ingredients. The lining pad is then transferred to curing ovens and cured at temperatures ranging from 300° to 600° F. to further set the resins.

Organic non-asbestos systems typically include a powdered thermosetting resin: cashew particles; non-asbestos fibers; and more than 20%, by weight, of a powdered inorganic compound having a Mohs' hardness rating of greater than 2, less than 5, and capable of being subjected to temperatures of greater than about 425° C. without substantial chemical or physical alteration. Such components are described in greater detail in U.S. Pat. No. 4,137,214 which patent is hereby incorporated by reference herein for the purpose of such additional description. Organic non-asbestos systems typically may contain the following amount of the above ingredients:

| Ingredient | Wt. % |
| --- | --- |
| Thermosetting Resin | 10–30 |
| Cashew Nut Particles | 5–25 |
| Non-Asbestos Fibers | 5–15 |
| Inorganic Compound | 20–60 |

Another so-called organic non-asbestos friction material is disclosed in U.S. Pat. No. 4,278,584. This patent discloses the following general formulation:

| Ingredient | Wt. % |
| --- | --- |
| Phenol-formaldehyde Resin | 6–12 |
| Carbon Fibers | 10–40 |
| Steel Fibers | 30–60 |
| Inorganic and/or Organic Fibers | 10–20 |

Friction elements may typically be manufactured from dry organic non-asbestos mixtures by placing a quantity of the mixture in a mold and compressing the mixture to form a preform and then curing the preform under heat and pressure. The edges of the cured preform are then trimmed to remove excess material and the preform post-baked while under constraint in a forming container to prevent swelling.

The friction materials of the present invention comprise, in addition to the above-described dry blend, a thermosetting or thermoplastic matrix resin which serves as a carrier for the other components thereof, depending upon the intended use and desired result. The thermosetting (or thermoset) materials are those which exhibit no melting temperature and which yield high char residues. Where the intended uses are for a high temperature, high stress nature, the matrix resin usually is a thermosetting material, since such decompose rather than melt at high temperature. When the matrix material melts or flows, strength is difficult to maintain. Suitable thermosetting materials include phenolic resins, aromatic polyamides, polybenzoxadiazoles, polyimides, polybenzimidazoles, melamine resins, urea resins, epoxy resins and the like.

Thermoplastic matrices are those which tend to melt and resolidify at certain temperatures and under particular conditions. They are generally used in gasketing and low temperature, low friction applications. Useful thermoplastic materials include polyamides such as nylon, polyesters, acrylics, fluoropolymers and the like.

The matrix resin constitutes from about 10 to about 40% of the friction materials of the present invention with the remaining amounts being well known friction components including such other components such as fillers e.g. as to promote friction, such as iron grit, fused silica, sand; friction modifiers such as graphite, partially cured cashew-resin solids, lead, lead sulfide; friction regulators such as alumina, silica, diatomaceous earth, chalk, talcum, kaolin, mica, talc etc. These fillers are generally employed as solids having average diameter of 300 microns and less.

During mixing, the fibrillated fibers, via their tentacle-like projections, catch the staple fibers and particulate polymer so as to evenly distribute them and prevent excessive bulk. According to the instant process, the fibrillated, synthetic organic polymer fiber and the synthetic, organic polymer staple fiber are mixed as a net slurry in, for example, a hydropulper, a beater, a disc refiner or similar equipment, alone or in combination with the soluble, synthetic organic polymer particles, and then drie (dewatered) on, for example, a paper machine or belt press to 30–60% solids. Suitable cationic and/or anionic retention aids may be used to retain particulate polymer and fiber staple in the fibrillated fiber. Additionally, the particulate polymer can be blended with the wet fibrillated fiber and staple fiber, which is at a 30–60% solids content, during drying and fluffing in equipment such as a Rennelburg rotary dryer. As mentioned above, the fibrillated fiber-fiber staple-particulate polymer blend mav constitute from about 1 to about 30 weight percent, of the friction material, preferably from about 5 to about 25 weight percent.

The following examples are set forth for the purpose of illustration only and are not to be construed as limitations on the present invention except as set forth in the appended claims. All parts are by weight unless otherwise specified.

EXAMPLE A

Thirty pounds of a non-asbestos organic (NAO) friction formulation is prepared using the components set forth in Table 1. The formulation is mixed in a Littleford Model FM-130-D Mixer. All components except fiberglass are premixed for ten minutes. The fiberglass is then added and the formulation is mixed for another one minute. Star/bar choppers and Becker plows are used in the Littleford Mixer. The resultant product is identified as Brake Mix A.

Example 1 (Comparative)

100 parts of Brake Mix A are added to a commercial Waring blender and mixed for one minute at 40% power on the low speed setting. The formulation is then pressed into preforms using the following steps:

A 150 gm sample of mix is evenly spread in a FMSI 728A disc pad preform mold. If difficulty filling the mold because of excessive mix bulkiness is encountered, this mix attribute is noted. A pressure of 2,500 psi is applied and held for five (5) seconds. The resulting preform is removed from the mold and visually examined for any soft edges, breakage or nonuniformity. Seven (7) preforms are prepared. Comments on appearance are set forth in Table 2.

The preforms are allowed to stabilize at ambient temperature and humidity (23° C. - 50% RH) for 24 hours before testing. The height of the preforms and the recovery are then measured at the end of this time. Results are set forth in Table 2.

A 3-point flexural strength measurement is performed on preforms using an INSTRON Model 1125 testing machine at a cross-head speed of 0.1 inch/minute. Test span is four inches.

The breaking load (pounds) is recorded directly from chart recorder. Using a line tangent to the curve, the inches of pad deflection is calculated from zero to two pounds and divided by the deflection to calculate stiffness in pounds/inch.

The averages for breaking load and stiffness and 90% confidence level are calculated and the results are set forth in Table 2.

A measured performance index, MPI, which is defined as:

$$MPI=(\text{Average Strength} \times \text{Average Stiffness})^{1/2}$$

is calculated and the results are set forth in Table 2.

For comparative purposes, a predicted performance index is calculated. This index is the value expected if only the fibrillated fiber portion of the blend is used. Performance over and above this predicted factor shows the staple fiber and powder contributions to preforming.

TABLE 1

| INGREDIENT | PARTS BY WEIGHT |
|---|---|
| PHENOLIC POWDER HRJ 652 | 16.6 |
| BARYTES 22 | 39.6 |
| 4079 COKE | 9.4 |
| NC108 CASHEW PARTICLE | 5.0 |
| VERMICULITE #7 | 15.6 |
| VIRGINIA KYANITE | 0.7 |
| FIBERGLASS, ⅛" 178A-BA | 4.9 |
| LAPINUS ROCKWOOL L5164 | 6.7 |
| HYCAR 1411 RUBBER | 1.5 |
| TOTAL: | 100.0 |

In the following examples, the following are designations of the specifics of various blend components as used therein:

| Fibrillated Fiber Designation | Commercial Designation | CSF | Surface Area M²/g | Average Fiber Length, In. | Maximum Fiber Length, In. | Efficiency Index |
|---|---|---|---|---|---|---|
| A | CFF V110-1 | 250 | 50 | .25 | .30 | 1.10 |
| B | (110-1) | 180 | 50 | .25 | .30 | 1.52 |
| C | (110-1) | 430 | 50 | .28 | .32 | 0.70 |
| D | acrylic | 600 | 10 | .22 | .28 | 0.41 |
| E | acrylic | 425 | 10 | .20 | .36 | .63 |
| F | polypropylene | - | - | .28 | .31 | — |
|   | cellulose acetate | - | - | .26 | .40 | — |

| Staple Designation | Chemical Description | Denier, g/9000 m | Diameter Microns | Length (in.) | Modulus MSI | Crimp | Tenacity g/den |
|---|---|---|---|---|---|---|---|
| A | Acrylic | 1.1 | 13 | .25 | 0.75 | Yes | 3.0 |
| B | Acrylic | 0.8 | 10 | .25 | 0.5 | Yes | 2.5 |
| C | Acrylic | 0.8 | 10 | .50 | 0.5 | Yes | 2.5 |
| D | Acrylic | 5.4 | 23 | .25 | 0.8 | Yes | 3.0 |
| E | Acrylic | 3.0 | 18 | .25 | 0.5 | No | 2.5 |
| F | Acrylic | 16.0 | 40 | .25 | 0.5 | Yes | 2.0 |
| G | Acrylic | 5 | 22 | .25 | 0.5 | No | 2.5 |
| H | Acrylic | 1.5 | 13 | .25 | 2.0 | No | 5.0 |
| I | Pre-ox | 1.5 | 12.5 | .25 | 1.1 | No | 2.6 |
| J | Pre-ox | 1.5 | 12.5 | .125 | 1.3 | No | 2.6 |
| K | Aramid | 1.5 | 12 | .25 | 8 | No | 15–30 |
| L | Novoloid | 2 | 15 | .25 | 0.5 | No | 1.0 |
| M | Cellulose | N.A. | 30–40 | .16 | 0.8 | No | 5.0 |
| N | Cotton | N.A. | 25 | .10 | 0.8 | No | 5.0 |
| O | Acrylic | 0.8 | 10 | .04 | .5 | Yes | 2.5 |
| P | Acrylic | 1.1 | 13 | .02–.10 | .75 | Yes | 3.0 |
| Q | Acrylic | 5 | — | 0.2–.10 | .5 | No | 2.5 |
| R | Pre-ox | 1.5 | 13 | .25 | 1.0 | No | 2.5 |

| Powder Designation | Polymer Type | Average Particle Diameter, Micron | Surface Area, M²/g |
|---|---|---|---|
| A | acrylic | 50 | 8 |
| B | acrylic | 20 | 12 |
| C | acrylic | 30 | 9 |
| D | partially oxidized acrylic | 20 | 10–12 |
| E | polyetherimide | 50–100 | <2 |
| F | polyamideimide | 5 | <2 |
| G | pre-oxidized acrylic | 15 | 10–12 |
| H | acrylic | 50 | 8 |

Example 2 (Comparative)

The procedure of Example 1 is again followed except that 4 parts of fibrillated acrylic fiber A are added to 96 parts of Brake Mix A and mixed in the Waring Blender. The results are also set forth in Table 2, below.

Examples 3 and 4

The procedure of Example 1 is again followed except that 4 parts of a hybridized acrylic composite mixture, consisting of the ratios set forth below:

| MIXTURE | EXAMPLE 3 (comparative) | EXAMPLE 4 |
|---|---|---|
| Fibrillated Fiber (A) | 60 | 60 |
| Staple (R) | 30 | 30 |
| Powder (A) | 10 | 10 | are added to 96 parts of Brake Mix A and mixed in the Waring Blender. These examples vary only in the method used to combine the fibrillated fiber and staple prior to adding the powder (A) and mixing the resultant three-component system with Brake Mix A, i.e., Example 3

Blended Dry In Waring Blender
Aqueous Solution And Dried

Example 4

Blended Wet In Waring
Blender at 1% Solids

As can be readily appreciated, the preformed pads of Example 4 produced according to this instant invention unexpectedly are superior to Example 3 in preform strength, preform stiffness and measured performance index (MPI).

TABLE 2

| Property | Unit | No Fiber (Example 1) | Fibrillated Fiber (A) (Example 2) | 60/30/10 (Example 3) | 60/30/10 (Example 4) |
| --- | --- | --- | --- | --- | --- |
| Mix Bulkiness | — | Dense | O.K. | Excessive | O.K. |
| Preform Strength | lbs | .81 | 2.79 | 2.62 | 3.18 |
| Preform Stiffness | lbs/in. | 23 | 67.6 | 41 | 65 |
| Thickness | in. | 0.915 | 0.927 | 1.010 | 0.991 |
| Recovery | % | 4.7 | 4.1 | 5.9 | 5.3 |
| Appearance | — | Low Integrity Crumbles on Handling | High integrity preform, No cracking or Crumbling, Good uniformity | Edge Determination | High integrity preform, No cracking or Crumbling, Good uniformity |
| Measured Performance Index | — | 4.3 | 13.7 | 10.4 | 14.4 |

Example 5

The procedure of Example 1 is again followed except that 2 parts of a hybridized acrylic composite mixture, preblended in an aqueous slurry, consisting of 30 parts of Fibrillated Fiber A, 60 parts of Staple H and 10 parts of Powder A, are added to 98 parts Brake Mix A and mixed in the Waring Blender.

The preblended hybridized composite mixture is prepared by mixing the components together for 30 seconds in a 1% solids water slurry using Waring Blender set at 50% of low speed. The hybridized composite mixture is drained through a 200 mesh screen and air dried for 2 hours at 70 degrees Celsius to produce the dry hybridized composite mixture used in this example.

The results are set forth below.

The preforms produced have an average thickness of 0.966 inch. Recovery after four hours is 6.2%. The preforms have an average strength of 1.85 pounds and an average stiffness of 39 pounds per inch. The calculated performance factor is 8.5. Preforms are of high integrity with no crumbling and good uniformity. Hairline cracks are observed on the top surface of the preforms, but this is not uncommon for preforms containing only 2% of a preforming aid.

As can be readily noted, up to 60% staple can be used in these hybridized acrylic composite mixtures and provide adequate preforming properties to a dry brake mix.

Examples 7–26

The procedure of Example 1 is again followed except that the following fibrillated fibers, staple fibers and powders are used as identified. Similar results are achieved.

| | Fibrillated Fiber | Staple Fiber | Powder |
| --- | --- | --- | --- |
| Example 7 | A | O | H |
| Example 8 | B | P | H |
| Example 9 | A | Q | H |
| Example 10 | C | B | A |
| Example 11 | G | C | A |
| Example 12 | D | D | A |
| Example 13 | A | E | F |
| Example 14 | E | F | A |
| Example 15 | A | G | A |
| Example 16 | A | A | B |
| Example 17 | F | K | C |
| Example 18 | B | A | B |
| Example 19 | C | L | B |
| Example 20 | A | H | G |
| Example 21 | A | I | B |
| Example 22 | A | J | B |
| Example 23 | A | H | D |
| Example 24 | A | M | D |
| Example 25 | A | J | D |
| Example 26 | A | N | E |

Examples 27 and 28

The procedures of Examples 1 and 5, respectively, are followed except that the fibrillated fiber, the staple fiber and the powder are all produced from aramid polymer. Similar results are achieved.

Examples 29 and 30

The procedures of Examples 1 and 5, respectively, are again followed except that the powder is produced from aramid polymer. Similar results are obtained.

Examples 31 and 32

The procedures of Examples 1 and 5, respectively, are again followed except that both the staple fiber and powder are produced from aramid polymer. Similar results are achieved.

We claim:

1. A method of making a dry blend for use in the preparation of a friction material wherein the blend comprises:
   a) from about 25 to about 75 weight percent of a fibrillated, synthetic, organic polymer fiber;
   b) from above about 5 to about 60 weight percent of a synthetic, organic polymer soluble in water staple fiber and
   c) from about 5 to about 70 weight percent of soluble, synthetic, organic polymer particles which comprises blending components a) and b), alone or in combination with component c), in water at a solids content of no more than about 5%, drying the resultant blend and adding component c), if not added previously, to the resultant dry blend and wherein the weight of components a), b) and c) is from about 1 to about 30 weight percent of the total friction material.

2. A method according to claim 1 wherein at least one of a), b), and c) is an acrylic fiber.

3. A method according to claim 1 wherein each of a), b) and c) is an acrylic fiber.

4. A method according to claim 2 wherein said acrylic fiber is an acrylonitrile polymer.

5. A method according to claim 3 wherein said acrylic fiber is an acrylonitrile polymer.

6. A method according to claim 1 wherein b) has a length of from about 0.5–7 mm.

7. A method according to claim 1 wherein either or both of a) and/or b) are crimped.

8. A method according to claim 1 wherein either or both of a) and/or b) are preoxidized.

9. A method according to claim 1 wherein a) and b) are blended alone.

10. A method according to claim 1 wherein a) and b) are blended in combination with c).

11. A dry friction material comprising 1) from about 1 to about 30 weight percent based on the total weight of components a), b) and c) of a dry blend comprising:
   a) from about 25 to about 75 weight percent of a fibrillated, synthetic, organic polymer fiber;
   b) from above about 5 to about 60 weight percent of a synthetic, organic polymer staple fiber and
   c) from about 5 to about 70 weight percent of soluble, synthetic, organic polymer particles, and 2) from about 70 to about 99 weight percent of other friction material components.

12. A friction material according to claim 11 wherein at least one of a), b) and c) is an acrylic polymer.

13. A friction material according to claim 11 wherein each of a), b) and c) is an acrylic polymer.

14. A friction material according to claim 12 wherein said acrylic polymer is an acrylonitrile.

15. A friction material according to claim 13 wherein said acrylic polymer is an acrylonitrile polymer.

16. A friction material according to claim 11 wherein b) has a length of from about 0.5–7.0 mm.

17. A friction material according to claim 11 wherein either or both of a) and/or b) are crimped.

18. A friction material according to claim 11 wherein either or both of a) and/or b) are pre-oxidized.

19. A dry blend comprising:
   a) from about 25 to about 75 weight percent of a fibrillated acrylic or aramide polymer fiber,
   b) from above about 5 to about 60 weight percent of an acrylic or aramid polymer staple fiber and;
   c) from about 5 to about 70 percent soluble acrylic or aramid polymer particles.

* * * * *